United States Patent
Richard (10) Patent No.: US 10,969,139 B1
(45) Date of Patent: Apr. 6, 2021

(54) WATER HEATER

(71) Applicant: Willard Richard, Tooele, UT (US)

(72) Inventor: Willard Richard, Tooele, UT (US)

(*) Notice: Subject to any disclaimer, the term of this patent is extended or adjusted under 35 U.S.C. 154(b) by 126 days.

(21) Appl. No.: 16/391,387

(22) Filed: Apr. 23, 2019

(51) Int. Cl.
| F24H 8/00 | (2006.01) |
| F24H 1/20 | (2006.01) |
| F24H 9/18 | (2006.01) |
| F24D 19/10 | (2006.01) |

(52) U.S. Cl.
CPC .......... *F24H 1/206* (2013.01); *F24D 19/1051* (2013.01); *F24H 9/1836* (2013.01); *F24D 2220/0207* (2013.01)

(58) Field of Classification Search
CPC .... F24H 1/208; F24H 8/00; F22B 9/02; F22B 9/14; F22B 9/18
See application file for complete search history.

(56) References Cited

U.S. PATENT DOCUMENTS

| D138,546 S | 8/1944 | Stempel | |
| 2,427,476 A | 9/1947 | Schick | |
| 2,515,650 A * | 7/1950 | Hunt | F24D 1/00 237/9 R |
| 2,832,320 A * | 4/1958 | Thome | F24H 1/282 122/121 |
| 3,219,017 A | 11/1965 | Thybault | |
| 4,948,948 A | 8/1990 | Lesage | |
| 5,197,415 A * | 3/1993 | Stretch | F23C 3/004 122/14.22 |
| 5,293,446 A | 3/1994 | Owens | |
| 5,699,756 A * | 12/1997 | Ross | F24H 1/206 122/161 |
| 6,198,879 B1 * | 3/2001 | Harris | F24H 7/0433 392/451 |
| 6,553,948 B1 * | 4/2003 | Luo | F24H 1/0009 122/18.1 |
| 7,290,503 B2 * | 11/2007 | Missoum | F24H 1/206 122/18.1 |
| 7,559,293 B2 * | 7/2009 | Gordon | F24H 1/205 122/13.01 |
| 7,900,589 B2 * | 3/2011 | Gordon | F24H 1/205 122/18.31 |
| 8,807,093 B2 | 8/2014 | Steinhafel | |

(Continued)

FOREIGN PATENT DOCUMENTS

EP 0915304 3/2005

*Primary Examiner* — Gregory A Wilson
(74) *Attorney, Agent, or Firm* — Kyle A. Fletcher, Esq.

(57) ABSTRACT

The improved water heater is a combustion reaction based water heating apparatus. The improved water heater is used to heat fresh water for domestic and light industrial purposes. The improved water heater includes a tank and an enhanced heating device. The insulating structure stores the water during and after the heating process. The enhanced heating device: a) contains the combustion reaction; and, b) transfers through a heat exchange mechanism the heat generated by the combustion reaction to the water contained within the insulating structure. The enhanced heating device includes a heat exchange apparatus. When compared to a traditional exhaust flue, the heat exchange apparatus more efficiently transfers heat between the heated exhaust gases from the combustion reaction and the water contained in the insulating structure.

16 Claims, 4 Drawing Sheets

(56) References Cited

U.S. PATENT DOCUMENTS

| | | | |
|---|---|---|---|
| 9,714,774 B2 * | 7/2017 | Boros | F22B 21/348 |
| 10,267,537 B2 * | 4/2019 | Johnson, Sr. | F23Q 3/008 |
| 10,415,849 B2 * | 9/2019 | Boros | F24H 8/006 |
| 2013/0104941 A1 * | 5/2013 | Liu | A47L 15/248 |
| | | | 134/63 |

* cited by examiner

WATER HEATER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of heat exchange and heat exchange apparatus, more specifically, a single medium heat exchange apparatus with a) stationary conduit incorporated into the tank; and, b) heat exchange occurring across the conduit wall. (F28D1/06)

This disclosure is related to the operation of a traditional combustion-based water 171 heating apparatus. An example of a traditional combustion-based water 171 heating apparatus is a traditional water 171 heater commonly found in domestic and light industrial settings. By combustion based is meant that a fuel is burned in a combustion process to generate the heat necessary to heat the fresh water 171 contained within the combustion based water 171 heating device. This disclosure assumes that the fuel is a natural gas. Those skilled in the chemical and plumbing arts will recognize that other fuel sources may be substituted into the combustion process without undue experimentation.

The traditional combustion-based water 171 heating apparatus comprises a tank 101 and a heating mechanism. The heating mechanism heats fresh water 171 contained within the tank 101.

The tank 101 is a containment structure that stores the water 171 heated by the traditional combustion-based water 171 heating apparatus. The tank 101 is an enclosed insulating structure 111 formed from an insulating material 161 sandwiched between an inner shell 162 and an outer shell 163. The tank 101 further comprises a fresh water 171 inlet, a heated water 171 outlet, a drain valve 112 and an overflow pipe 113. The heated water 171 outlet is a pipe that removes heated water 171 that is contained in the tank 101. The fresh water 171 inlet is a pipe that replaces the removed heated water 171 with fresh water 171. The drain valve 112 is a pipe that further comprises a valve. The drain valve 112 allows for the rapid removal of water 171 from the tank 101 during maintenance activities. The overflow pipe 113 is a pipe that allows the tank 101 to drain excess water 171 that may accumulate in the tank 101.

The heating mechanism: a) contains the combustion reaction; and, b) transfers through a heat exchanger the heat generated by the combustion to the water 171 contained within the tank 101. The heating mechanism comprises a water conduit 121, a combustion chamber 122, an exhaust flue, and a thermostat 135. The combustion chamber 122 is an isolated chamber in which that combustion reaction occurs. The water conduit 121 comprises a piping network that feeds fresh water into the tank 101. The exhaust flue is a pipe that transports the heated exhaust gases generated by the combustion reaction through the water 171 stored within the tank 101 before discharging the heated exhaust gases into the atmosphere. The thermostat 135 is a well-known and documented electrical switching feedback device used to control the temperature of the water 171 contained in the tank 101.

The heat exchange between the heated exhaust gases and the water 171 occurs using heat conduction through the walls of the pipe that forms the exhaust flue.

One drawback of the traditional water 171 heating apparatus is that most of the heat generated by combustion is exhausted into the atmosphere instead of being transferred into the water 171. Clearly, a more efficient method of heat exchange would benefit the process.

SUMMARY OF INVENTION

The improved water heater is a combustion reaction based water heating apparatus. The improved water heater is configured to heat fresh water for domestic and light industrial purposes. The improved water heater comprises a tank and an enhanced heating device. The tank comprises an insulating structure. The insulating structure stores the water during and after the heating process. The enhanced heating device: a) contains the combustion reaction; and, b) transfers through a heat exchange mechanism the heat generated by the combustion reaction to the water contained within the insulating structure. The enhanced heating device comprises a heat exchange apparatus. When compared to a traditional exhaust flue, the heat exchange apparatus more efficiently transfers heat between the heated exhaust gases from the combustion reaction and the water contained in the insulating structure.

These together with additional objects, features and advantages of the improved water heater will be readily apparent to those of ordinary skill in the art upon reading the following detailed description of the presently preferred, but nonetheless illustrative, embodiments when taken in conjunction with the accompanying drawings.

In this respect, before explaining the current embodiments of the improved water heater in detail, it is to be understood that the improved water heater is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the improved water heater.

It is therefore important that the claims be regarded as including such equivalent construction insofar as they do not depart from the spirit and scope of the improved water heater. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
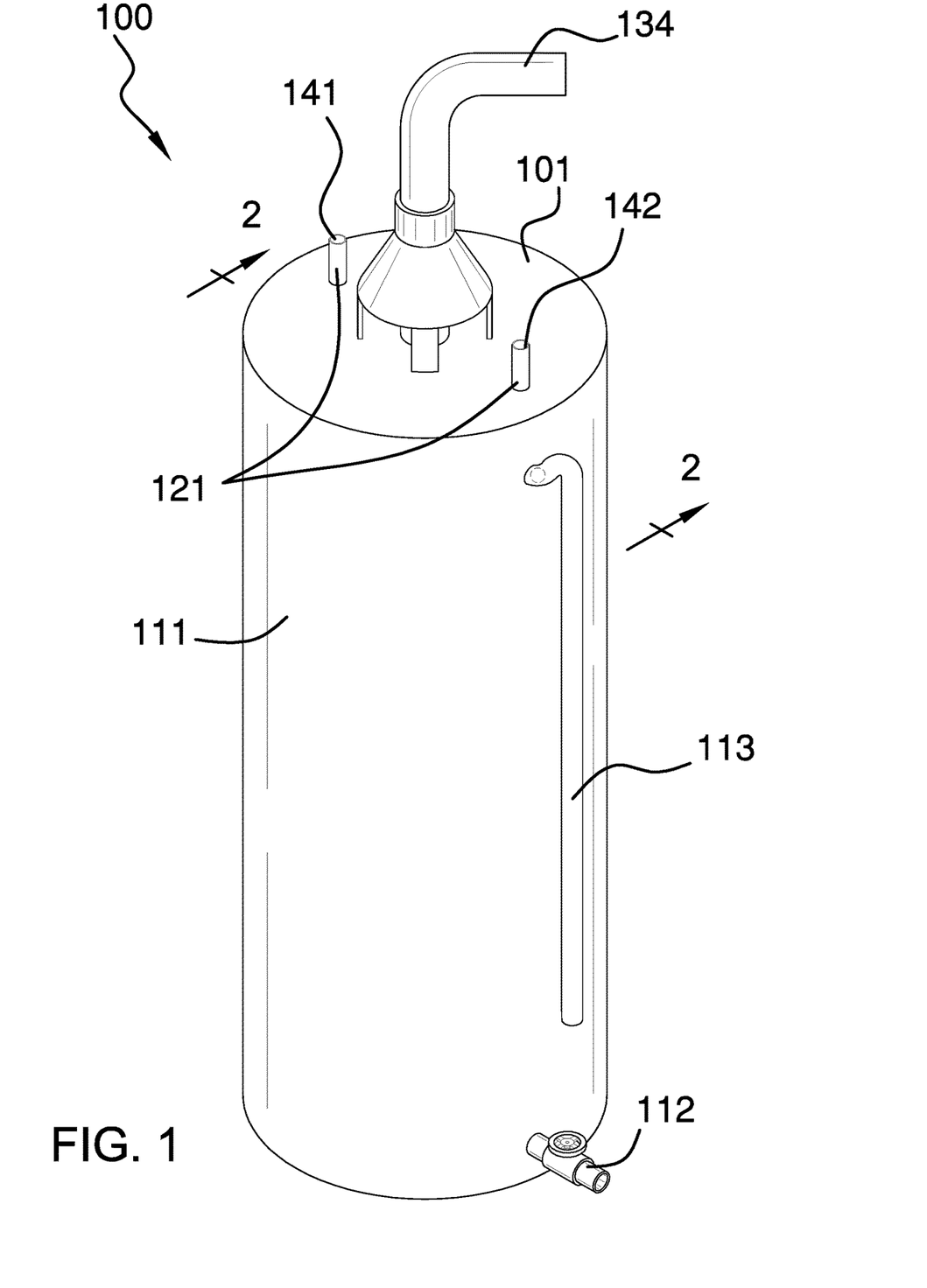
FIG. 1 is a perspective view of an embodiment of the disclosure.
Figure 2:
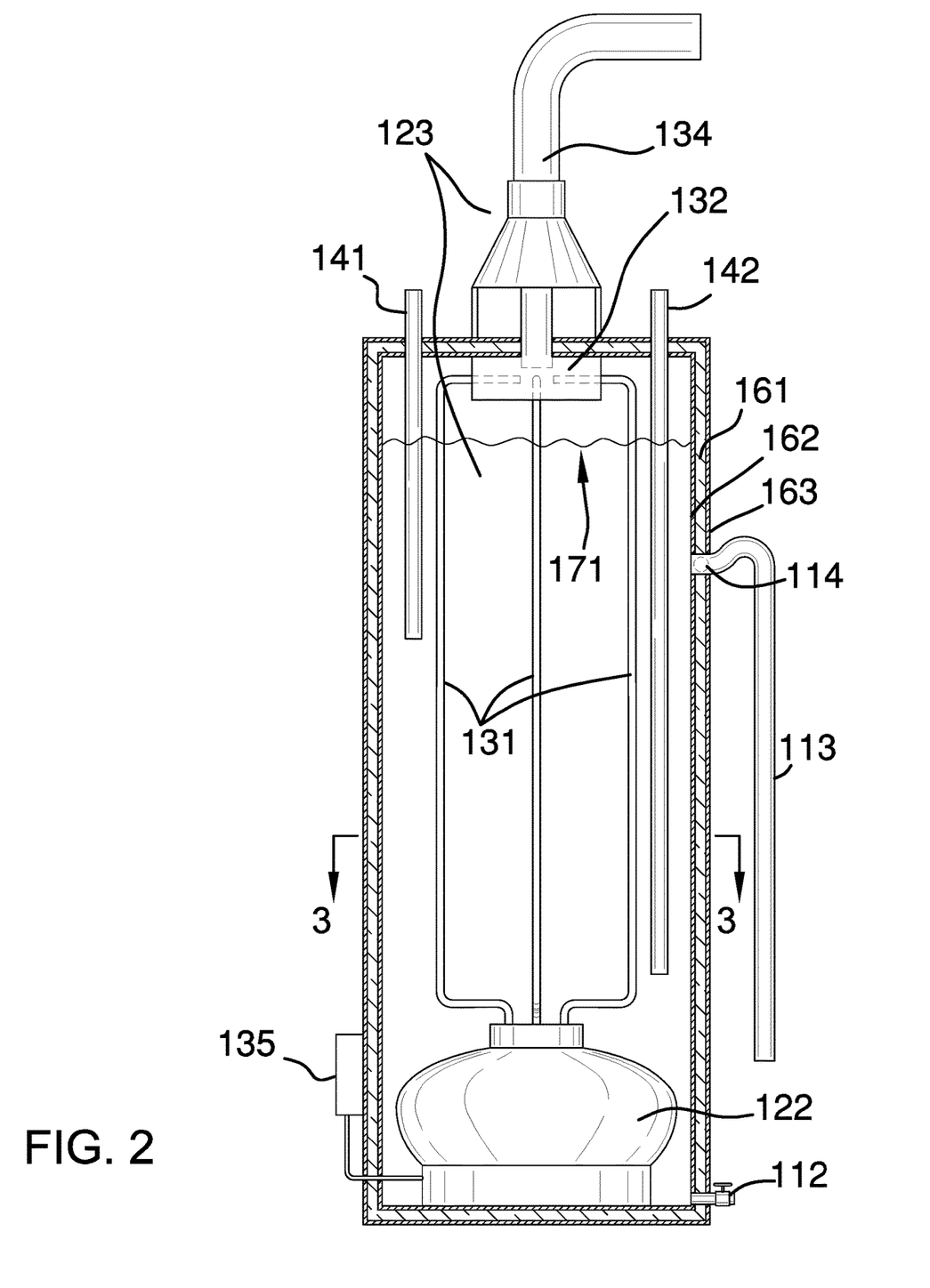
FIG. 2 is a cross-sectional view of an embodiment of the disclosure across 2-2 as shown in FIG. 1.
Figure 3:
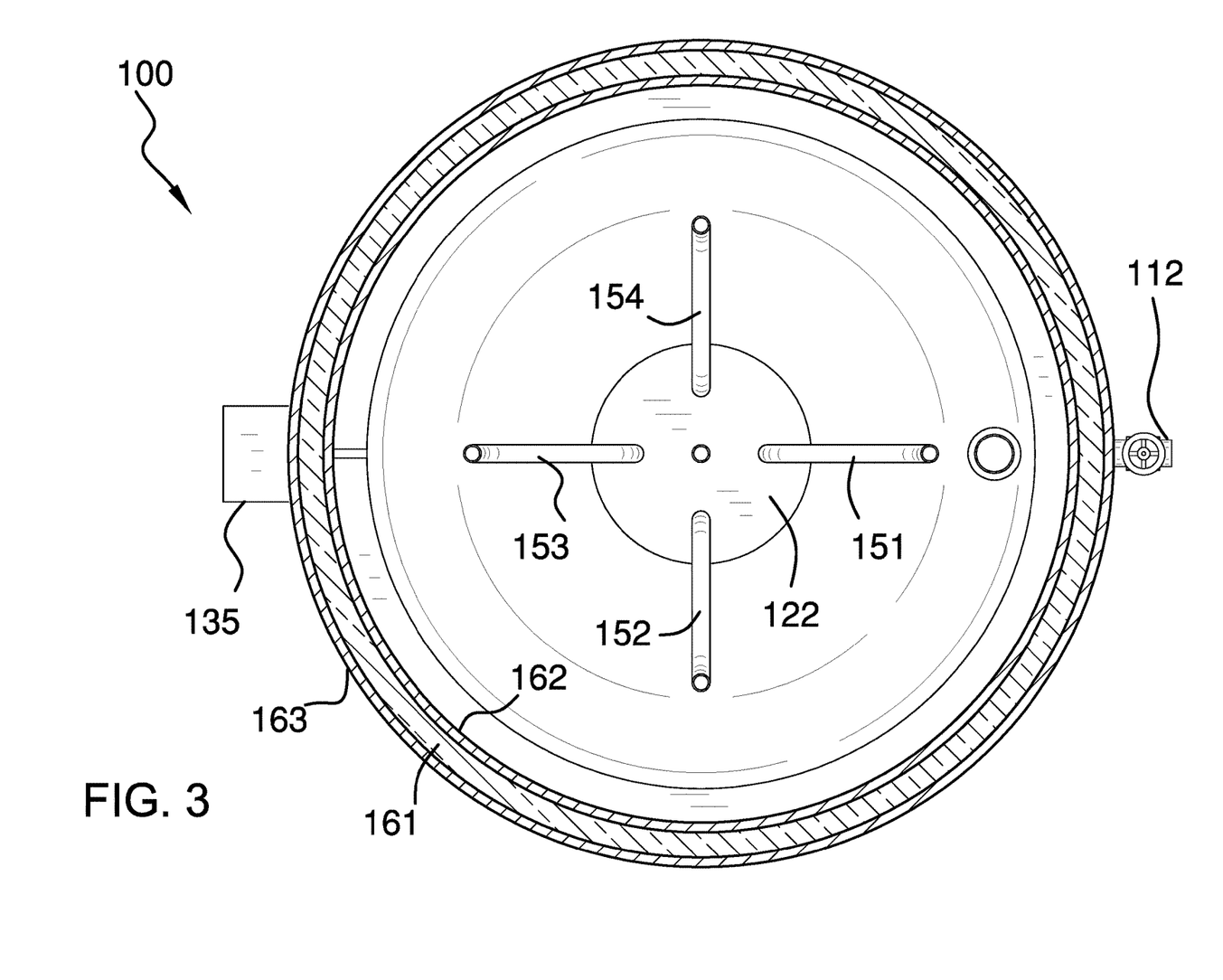
FIG. 3 is a cross-sectional view of an embodiment of the disclosure across 3-3 as shown in FIG. 2.
Figure 4:
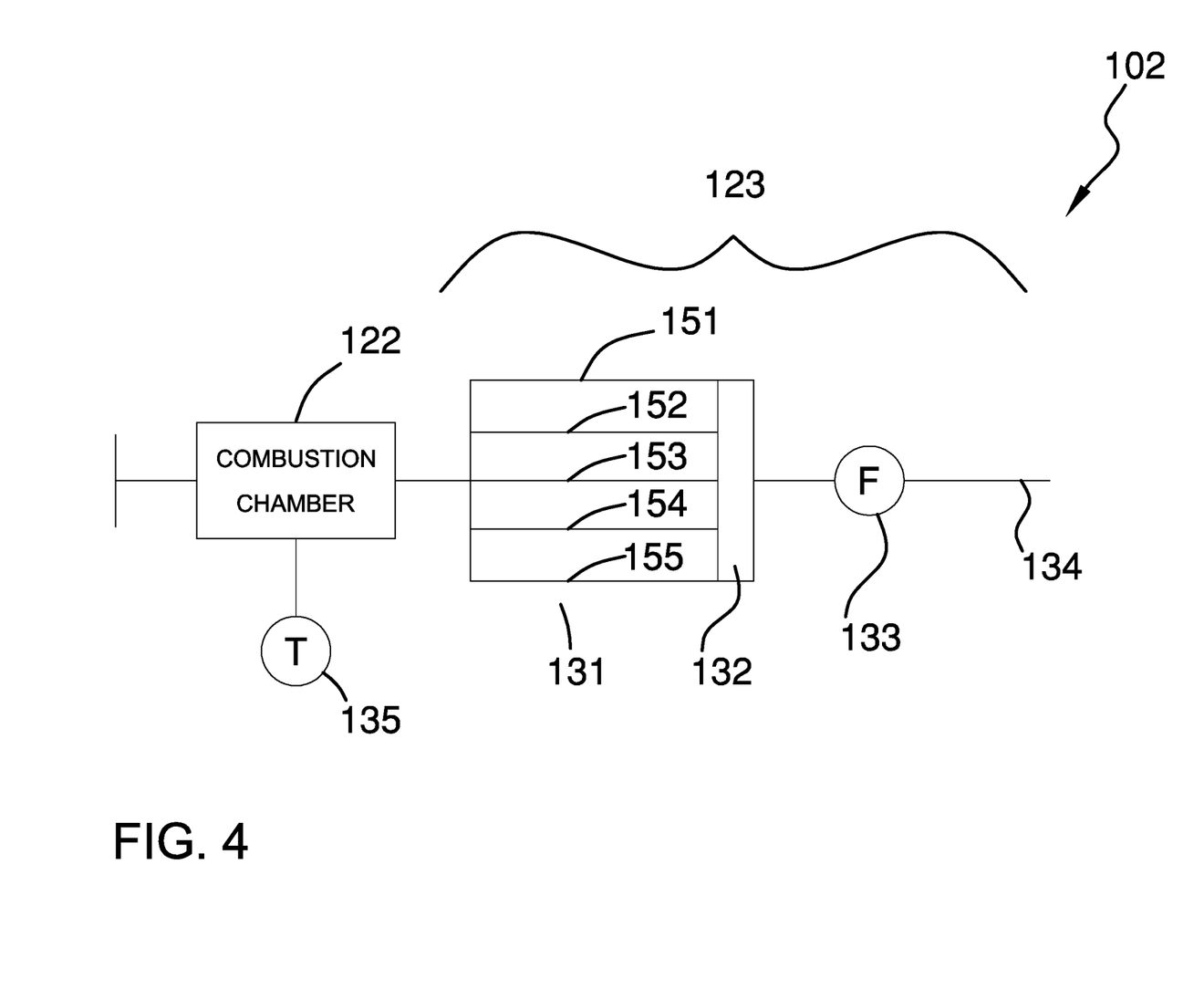
FIG. 4 is a schematic view of an embodiment of the disclosure.

Detailed reference will now be made to one or more potential embodiments of the disclosure, which are illustrated in FIGS. 1 through 4.

The improved water heater 100 (hereinafter invention) is a combustion reaction based water 171 heating apparatus. The invention 100 is configured to heat fresh water 171 for domestic and light industrial purposes. The invention 100 comprises a tank 101 and an enhanced heating device 102. The tank 101 comprises an insulating structure 111. The insulating structure stores the water 171 during and after the heating process. The enhanced heating device 102: a) contains the combustion reaction; and, b) transfers through a heat exchange mechanism the heat generated by the combustion reaction to the water 171 contained within the insulating structure 111. The enhanced heating device 102 comprises a heat exchange apparatus 123. When compared to a traditional exhaust flue, the heat exchange apparatus 123 more efficiently transfers heat between the heated exhaust gases from the combustion reaction and the water 171 contained in the insulating structure 111.

The tank 101 is a fluid impermeable containment structure. The tank 101 stores water 171 during and after the heating process. The tank 101 is an insulating structure 111 designed to inhibit cooling of the water 171 after heating. The tank 101 roughly follows the form of the tank 101 of a traditional combustion-based water 171 heating apparatus. The tank 101 is formed with the apertures and form factors necessary to accommodate the operation of the enhanced heating device 102. The tank 101 comprises an insulating structure 111, a drain valve 112, and an overflow pipe 113.

The insulating structure 111 forms the water 171 containment space of the tank 101. The design of the insulating structure 111 inhibits the transfer of heat from the interior of the tank 101 to the exterior of the tank 101. The insulating structure 111 roughly follows the form of the insulating structure 111 of a traditional combustion-based water 171 heating apparatus. The insulating structure 111 is formed with the apertures and form factors necessary to accommodate the operation of the enhanced heating device 102.

The insulating structure 111 comprises an insulating material 161, an inner shell 162, and an outer shell 163. The insulating material 161 of the tank 101 is analogous to the function and construction of the insulating material 161 of the tank 101 of the traditional combustion-based water 171 heating apparatus. The inner shell 162 of the tank 101 is analogous to the function and construction of the inner shell 162 of the tank 101 of the traditional combustion-based water 171 heating apparatus. The outer shell 163 of the tank 101 is analogous to the function and construction of the outer shell 163 of the tank of the traditional combustion-based water 171 heating apparatus.

The drain valve 112 is a pipe and valve used to drain water 171 from the insulating structure 111 for maintenance purposes. The function and the construction of the drain valve 112 of the tank 101 of the invention 100 is analogous to the function and construction of the drain valve 112 of a traditional combustion-based water 171 heating apparatus.

The overflow pipe 113 is a pipe that allows the tank 101 of the invention 100 to drain excess water 171 that may accumulate in the tank 101. The function and the construction of the overflow pipe 113 of the tank 101 of the invention 100 is analogous to the function and construction of the overflow pipe 113 of a traditional combustion-based water 171 heating apparatus. The overflow pipe 113 further comprises a pressure release valve 114. The pressure release valve 114 is a ball valve that prevents the backflow of water from the overflow pipe 113 back into the tank 101.

The enhanced heating device 102 is the heating apparatus of the invention 100. The enhanced heating device 102 is a combustion-based structure. The enhanced heating device 102 replaces the traditional exhaust flue of a traditional combustion-based water 171 heating apparatus with a plurality of networked exhaust flues 131. The enhanced heating device 102 comprises a water conduit 121, a combustion chamber 122, and a heat exchange apparatus 123.

The water conduit 121 include a pipe that transports fresh water into the tank 101 for heating. The function and the construction of the water conduit 121 of the enhanced heating device 102 is analogous to the function and construction of the water conduit 121 of the traditional combustion-based water 171 heating apparatus.

The water conduit 121 comprises a hot water supply 141 and a water intake 142. The hot water supply 141 is a pipe selected from the water conduit 121 that transports heated water from the tank 101. The water intake 142 is a pipe selected from the water conduit 121 that transports fresh water into the tank 101.

The combustion chamber 122 is an enclosed chamber positioned in a segregated space within the interior of the tank 101. The combustion reaction of the enhanced heating device 102 occurs within the combustion chamber 122. The function and the construction of the combustion chamber 122 of the enhanced heating device 102 is analogous to the function and construction of the combustion chamber 122 of the traditional combustion-based water 171 heating apparatus.

The heat exchange apparatus 123 forms the structure of the enhanced heating device 102 that exchanges heat from the heated exhaust gas generated by the combustion reaction. The heat exchange apparatus 123: a) transports the heated exhaust gas generated by the combustion reaction from the combustion chamber 122 to the manifold 132 in such a manner that, b) heat from the heated exhaust gas generated by the combustion reaction is exchanged with the water 171 stored in the tank 101. The heat exchange apparatus 123 comprises a plurality of networked exhaust flues 131, a manifold 132, an exhaust pump 133, a discharge pipe 134, and a thermostat 135.

The applicant prefers that each of the plurality of networked exhaust flues 131 be a 1.25 inch pipe of a type selected from the group consisting of type K, type L, and type M. The use of such a pipe increases the heat transfer efficiency of the invention 100 by over fifty percent relative to the four-inch exhaust flue commonly used in a traditional combustion-based water 171 heating apparatus.

The plurality of networked exhaust flues 131 is a piping network formed from commercially available cylindrical metal pipes. The plurality of networked exhaust flues 131 are fluidically interconnected such that the heated exhaust gas generated by the combustion reaction flows through each of the plurality of networked exhaust flues 131 as it is discharged from the combustion chamber 122. The metal walls of each of the plurality of networked exhaust flues 131 forms a conductive structure that transfers heat from the heated exhaust gas generated by the combustion reaction to the water 171 using a conductive process.

The plurality of networked exhaust flues 131 allows the enhanced heating device 102 to present a greater heat exchange surface area between the enhanced heating device 102 and the water 171 when compared to a traditional combustion-based water 171 heating apparatus. In the first potential embodiment of the disclosure, the plurality of networked exhaust flues 131 is designed such that, the effective heat transfer surface area of the heat exchange apparatus 123 is at least 25% greater than the heat transfer surface of the exhaust flue of an analogous traditional combustion-based water 171 heating apparatus. By analogous is meant that the water 171 of the tank 101 of the invention 100 and the tank 101 of the traditional combustion-based water 171 heating apparatus are identical.

The plurality of networked exhaust flues 131 comprises a first exhaust flue 151, a second exhaust flue 152, a third exhaust flue 153, a fourth exhaust flue 154, and a fifth exhaust flue 155.

The first exhaust flue 151 is an exhaust flue selected from the plurality of networked exhaust flues 131 that transports heated exhaust gas generated by the combustion reaction from the combustion chamber 122 to the manifold 132.

The second exhaust flue 152 is an exhaust flue selected from the plurality of networked exhaust flues 131 that transports heated exhaust gas generated by the combustion reaction from the combustion chamber 122 to the manifold 132.

The third exhaust flue 153 is an exhaust flue selected from the plurality of networked exhaust flues 131 that transports heated exhaust gas generated by the combustion reaction from the combustion chamber 122 to the manifold 132.

The fourth exhaust flue 154 is an exhaust flue selected from the plurality of networked exhaust flues 131 that transports heated exhaust gas generated by the combustion reaction from the combustion chamber 122 to the manifold 132. The fifth exhaust flue 155 is an exhaust flue selected from the plurality of networked exhaust flues 131 that transports heated exhaust gas generated by the combustion reaction from the combustion chamber 122 to the manifold 132.

The end of each exhaust flue selected from the plurality of networked exhaust flues 131 that is distal from the combustion chamber 122 forms a fluidic connection with the manifold 132. The manifold 132 transports and merges the flow of the heated exhaust gas generated by the combustion reaction transported through each exhaust flue selected from the plurality of networked exhaust flues 131 into a single gas flow.

The exhaust pump 133 is a mechanical device. The exhaust pump 133 generates a pressure differential used to: a) draw fresh air from the atmosphere into the combustion chamber 122; b) from the combustion chamber 122 and through the plurality of networked exhaust flues 131 to the manifold 132; c) through the manifold 132 into the intake of the exhaust pump 133; from which, d) the exhaust pump 133 discharges the heated exhaust gas generated by the combustion reaction through the discharge pipe 134 into the atmosphere. The exhaust pump 133 mounts between the manifold 132 and the discharge pipe 134.

The discharge pipe 134 is a piping structure that transports the heated exhaust gas generated by the combustion reaction from the exhaust pump 133 into the atmosphere.

The thermostat 135 is a commercially available electrical device. The thermostat 135 is a feedback system that ignites and extinguishes the combustion reaction within the combustion chamber 122 such that the water 171 contained within the tank 101 is maintained within a previously determined temperature range. The use of a thermostat 135 is well-known and documented in the electrical arts.

The following definitions were used in this disclosure:

Ball Valve: As used in this disclosure, a ball valve is a type of commercially available pressure release valve.

Pressure release valve: As used in this disclosure, a pressure release valve is a valve that permits the flow of fluid in a single direction. Within selected potential embodiments of this disclosure, the pressure release valve is a commercially available product that is selected from the group consisting of a ball valve and a Tesla valve.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon modified by functional groups, which releases energy.

Drain: As used in this disclosure, a drain is a fitting that is used to remove a fluid from a device.

Exterior: As used in this disclosure, the exterior is used as a relational term that implies that an object is not contained within the boundary of a structure or a space.

Fan: As used in this disclosure, a fan is a pump that moves a gas. The first potential embodiment of this disclosure assumes that the fan is a mechanical device with rotating blades used to create a flow or current of a gas.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets)

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connection are well-known and documented in the mechanical, chemical, and plumbing arts.

Gas: As used in this disclosure, a gas refers to a state (phase) of matter that is fluid and that fills the volume of the structure that contains it. Stated differently, the volume of a gas always equals the volume of its container.

Insulating Material: As used in this disclosure, an insulating material is a structure that inhibits, and ideally prevents, the transfer of heat through the insulating material. Insulating materials may also be used to inhibit or prevent the transfer of sound or the conduction of electricity through the insulating material. Methods to form insulating materials include, but are not limited to: 1) the use of materials with low thermal conductivity; and, 2) the use of a structural design that places a vacuum within the insulating material within the anticipated transfer path of the heat, sound, or electric current flow.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Manifold: As used in this disclosure, a manifold is a pipe or chamber having several ports through which liquid or gas is gathered or distributed.

Natural Gas: As used in this disclosure, the term natural gas refers to a gaseous fuel used to provide energy through combustion. The primary component of natural gas (typically >80%) is methane. Common secondary components include, but are not limited to, ethane, propane, butane, pentane, nitrogen, carbon dioxide and water vapor. Traces of alkenes, alkynes, cyclic carbon compounds and aromatic carbon compounds may also be found.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Shell: As used in this disclosure, a shell is a structure that forms an outer covering intended to contain an object. Shells are often, but not necessarily, rigid or semi-rigid structures that are intended to protect or insulate the object contained within it.

Thermostat: As used in this disclosure, a thermostat is a device that monitors the temperature of a space such that the thermostat 1) operates a switch when the measured temperature exceeds or falls below a first preset temperature; and, 2) performs the opposite operation on the switch when the measured temperature falls below or exceeds a second preset temperature. Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Valve: As used in this disclosure, a valve is a device that is use to control the flow of a fluid (gas or liquid) through a pipe, tube, or hose.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A water heating device comprising:
a tank, a water conduit, and an enhanced heating device;
wherein the enhanced heating device attaches to the tank;
wherein the water heating device is a combustion reaction based water heating apparatus;
wherein the water heating device is configured to heat fresh water;
wherein the tank stores the water during and after the heating process;
wherein the enhanced heating device: a) contains the combustion reaction; and,
  b) transfers through the heat generated by the combustion reaction to the water contained within the tank;
wherein the tank comprises an insulating structure, a drain valve, and an overflow pipe;
wherein the drain valve and the overflow pipe attach to the drain valve;
wherein the enhanced heating device comprises a combustion chamber and a heat exchange apparatus;
wherein the heat exchange apparatus attaches to the combustion chamber;
wherein the heat exchange apparatus comprises a plurality of networked exhaust flues, a manifold, an exhaust pump, a discharge pipe, and a thermostat;
wherein the plurality of networked exhaust flues, the manifold, the exhaust pump, and the discharge pipe are fluidically interconnect;
wherein the thermostat attaches to the tank.

2. The water heating device according to claim 1
wherein the insulating structure forms the water containment space of the tank;
wherein the insulating structure inhibits the transfer of heat from the interior of the tank to the exterior of the tank.

3. The water heating device according to claim 2
wherein the insulating structure comprises an insulating material, an inner shell, and an outer shell;
wherein the outer shell and the inner shell sandwich the insulating material.

4. The water heating device according to claim 3 wherein the overflow pipe is a pipe that drains excess water that accumulates in the tank.

5. The water heating device according to claim 4 wherein the water conduit transports fresh water through tank.

6. The water heating device according to claim 5
wherein the combustion chamber is an enclosed chamber;
wherein the combustion chamber is formed as a segregated space within the interior of the tank.

7. The water heating device according to claim 6 wherein the combustion reaction of the enhanced heating device occurs within the combustion chamber.

8. The water heating device according to claim 7 wherein the heat exchange apparatus forms the structure of the enhanced heating device that exchanges heat from the heated exhaust gas generated by the combustion reaction with the water in the tank.

9. The water heating device according to claim 8
wherein the plurality of networked exhaust flues is a piping network;
wherein each of the plurality of networked exhaust flues is a metal pipe.

10. The water heating device according to claim 9 wherein the plurality of networked exhaust flues are fluidically interconnected such that the heated exhaust gas generated by the combustion reaction flows through each of the plurality of networked exhaust flues as it is discharged from the combustion chamber.

11. The water heating device according to claim 10
wherein the end of each exhaust flue selected from the plurality of networked exhaust flues that is distal from the combustion chamber forms a fluidic connection with the manifold;
wherein the manifold transports and merges the flow of the heated exhaust gas generated by the combustion reaction transported through each exhaust flue selected from the plurality of networked exhaust flues into a single gas flow.

12. The water heating device according to claim 11
wherein the exhaust pump is a mechanical device;
wherein the exhaust pump generates a pressure differential that pumps air through the combustion chamber and the heat exchange apparatus;
wherein the exhaust pump mounts between the manifold and the discharge pipe;
wherein the discharge pipe is a piping structure that transports the heated exhaust gas generated by the combustion reaction from the exhaust pump into the atmosphere.

13. The water heating device according to claim 12
wherein the thermostat is an electrical device;
wherein the thermostat ignites and extinguishes the combustion reaction within the combustion chamber such that the water contained within the tank is maintained within a previously determined temperature range.

14. The water heating device according to claim 13
wherein the water conduit comprises a hot water supply and a water intake;
wherein the hot water supply is a pipe selected from the water conduit that transports heated water from the tank;
wherein the water intake is a pipe selected from the water conduit that transports fresh water into the tank.

15. The water heating device according to claim 14
wherein the plurality of networked exhaust flues comprises a first exhaust flue, a second exhaust flue, a third exhaust flue, a fourth exhaust flue, and a fifth exhaust flue;
wherein the first exhaust flue is an exhaust flue selected from the plurality of networked exhaust flues that transports heated exhaust gas generated by the combustion reaction from the combustion chamber to the manifold;
wherein the second exhaust flue is an exhaust flue selected from the plurality of networked exhaust flues that transports heated exhaust gas generated by the combustion reaction from the combustion chamber to the manifold;
wherein the third exhaust flue is an exhaust flue selected from the plurality of networked exhaust flues that transports heated exhaust gas generated by the combustion reaction from the combustion chamber to the manifold;
wherein the fourth exhaust flue is an exhaust flue selected from the plurality of networked exhaust flues that transports heated exhaust gas generated by the combustion reaction from the combustion chamber to the manifold;
wherein the fifth exhaust flue is an exhaust flue selected from the plurality of networked exhaust flues that transports heated exhaust gas generated by the combustion reaction from the combustion chamber to the manifold.

16. The water heating device according to claim 15 wherein each of the plurality of networked exhaust flues is a 1.25 inch pipe of a type selected from the group consisting of type K, type L, and type M.

* * * * *